United States Patent
Takao et al.

(10) Patent No.: US 10,135,131 B2
(45) Date of Patent: Nov. 20, 2018

(54) ELECTROMAGNETIC-WAVE TRANSMITTING COVER

(71) Applicant: TOYODA GOSEI CO., LTD., Kiyosu (JP)

(72) Inventors: Kazuki Takao, Kiyosu (JP); Daiichiro Kawashima, Kiyosu (JP); Takashi Sekiya, Kiyosu (JP); Hideto Maeda, Kiyosu (JP); Koji Okumura, Kiyosu (JP); Kenji Suzuki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 132 days.

(21) Appl. No.: 14/959,018

(22) Filed: Dec. 4, 2015

(65) Prior Publication Data

US 2016/0248152 A1 Aug. 25, 2016

(30) Foreign Application Priority Data

Feb. 25, 2015 (JP) ................................. 2015-035596

(51) Int. Cl.
*H01Q 1/42* (2006.01)
*G01S 13/93* (2006.01)
(Continued)

(52) U.S. Cl.
CPC ........... *H01Q 1/422* (2013.01); *G01S 13/931* (2013.01); *H01Q 1/44* (2013.01); *G01S 2007/027* (2013.01)

(58) Field of Classification Search
CPC ........ H01C 1/32; H01C 1/3233; H01C 1/325; H01C 1/3283; H01C 1/42; H01C 1/422; H01C 1/44
(Continued)

(56) References Cited

U.S. PATENT DOCUMENTS 6,961,023 B2 * 11/2005 Fujii ................... B29C 45/1671
  343/700 MS
7,990,334 B2 * 8/2011 Maeda ................ B29C 45/1671
  343/711

FOREIGN PATENT DOCUMENTS

| JP | H08-111132 A | 4/1996 |
| JP | 2006-077804 A | 3/2006 |
| JP | 4888732 B2 | 12/2011 |

OTHER PUBLICATIONS

Office Action dated Oct. 2, 2018 issued in corresponding JP patent application No. 2015-035596 (and English translation).

* cited by examiner

*Primary Examiner* — Tho G Phan
*Assistant Examiner* — Patrick Holecek
(74) *Attorney, Agent, or Firm* — Posz Law Group, PLC (57) ABSTRACT

To provide an electromagnetic-wave transmitting cover which can achieve range extension and angle widening of a sensing radar and is excellent in design property. An electromagnetic-wave transmitting cover of the invention includes a base material made of an electromagnetic-wave-transmissive material, a light-transmitting base material formed on a surface of the base material and made of a light-transmissive material, and a design layer disposed between the base material and the light-transmitting base material, the electromagnetic-wave transmitting cover transmitting an electromagnetic wave, the electromagnetic-wave transmitting cover has an electromagnetic-wave transmitting area which transmits the electromagnetic wave, the base material and the light-transmitting base material in the electromagnetic-wave transmitting area has an interval of 0.12 mm or less, an adhesive layer is formed on an entire surface between the base materials, and a deviation in angle when the electromagnetic wave is transmitted is 0.3° or less.

7 Claims, 7 Drawing Sheets

(51) Int. Cl.
*H01Q 1/44* (2006.01)
*G01S 7/02* (2006.01)

(58) Field of Classification Search
USPC ............. 343/711, 712, 713; 1/711, 712, 713
See application file for complete search history.

ELECTROMAGNETIC-WAVE TRANSMITTING COVER

BACKGROUND

1. Technical Field

The present invention relates to an electromagnetic-wave transmitting cover.

2. Related Art

A. C. C. (abbreviation of Adaptive Cruise Control) is a technique that measures an inter-vehicle distance or a relative speed between one's own vehicle and a preceding vehicle with a sensor mounted on the front side of the vehicle, and controls a throttle and a brake on the basis of the obtained information to accelerate or decelerate its own vehicle so as to control the inter-vehicle distance. In recent years, this system has attracted attention as one of core competencies of an intelligent transport system (abbreviation: ITS) oriented toward moderation of traffic congestion and accident reduction.

As a sensor used in the A. C. C., in general, a laser radar or a millimeter-wave radar is used. For example, the millimeter-wave radar transmits a millimeter wave having frequencies of 30 GHz to 300 GHz and wavelengths of 1 to 10 mm and receives the millimeter-wave hit and reflected by an object to measure an inter-vehicle distance and a relative speed between one's own vehicle and a preceding vehicle on the basis of a difference between the transmitted wave and the received wave.

A radio-wave radar for vehicle device which transmits/receives a laser or a millimeter wave is generally disposed on the rear side of a front grille (unless otherwise stated, longitudinal directions, width directions, and the like correspond to directions defined with reference to a vehicle hereinafter). The front grille has an uneven thickness, and is made of metal or has a metal-plated layer formed on a surface thereof. Thus, the front grille interferes with a pathway of a radio wave (for example, a millimeter wave). For this reason, a technique that forms a window portion in a part of the front grille corresponding to the front side of the vehicle radio-wave radar device and fits a resin electromagnetic-wave transmitting cover in the window portion.

The electromagnetic-wave transmitting cover is located on a vehicle front surface and has a design layer to express various designs formed thereon. The design layer is a relatively thin layer that is formed by metal deposition, film transferring, or the like. For this reason, the front surface and the rear surface of the design layer need to be covered with reinforcing resin layers, respectively (for example, Japanese Patent No. 4888732).

Japanese Patent No. 4888732 describes a electromagnetic-wave transmitting cover including a front-side member having a transparent layer and a design layer, a rear-side member laminated on a rear-surface side of the front-side member, and a coupling layer laminated on an edge portion of at least one of the front-side member and the rear-side member and fixed to both the members, wherein both the members are formed as separated members and spaced apart from each other by 0.01 mm to 0.4 mm in longitudinal direction.

In the electromagnetic-wave transmitting cover described in Japanese Patent No. 4888732, a gap between the front-side member and the rear-side member is adjusted to reduce a loss caused by the gap (more specifically, an atmospheric air layer filled in the gap).

SUMMARY

In recent radio-wave radar devices, with the popularization of automatic brakes, sensing radars are desired to be long-range and wide-angle.

However, the electromagnetic-wave transmitting cover refers to only attenuation of a millimeter wave, and can disadvantageously cope with an increase in sensing distance.

The electromagnetic-wave transmitting cover is disposed in front of the radio-wave radar device (device for transmitting/receiving a radio wave) and commonly forms a part of the front surface of a vehicle. The electromagnetic-wave transmitting cover especially serves as the emblem of the vehicle. For this reason, an electromagnetic-wave transmitting cover for vehicle is desired to express various designs.

The electromagnetic-wave transmitting cover, in order to form a gap between the two members, is configured by an under-cut shape such that the members are integrally fixed to each other by being integrally bonded on an outer peripheral portion (more specifically, the coupling layer is configured by sandwiching an end portion of one of the members by the other member). Since the emblem (or electromagnetic-wave transmitting cover) is disposed on the front surface of the vehicle, the emblem requires high water-proof property and bonded and fixed on the entire circumference of the outer peripheral portion.

In this case, an area near the outer peripheral portion is an area for fixing both the members, and the design layer for expressing the design of the emblem cannot be formed in the area. As a result, the emblem (or electromagnetic-wave transmitting cover) is disadvantageously limited in the design expression thereof.

Furthermore, the configuration in which the members are integrally bonded to each other on the outer peripheral portion of the electromagnetic-wave transmitting cover is formed such that, in a state in which one member is disposed, the other member is insert-molded. The insert molding generates heat in a molding process to deform one member or the design layer. Depending on circumstances, the design layer may be damaged to deteriorate the design property.

The present invention has been made in consideration of the above circumstances, and its object is to provide an electromagnetic-wave transmitting cover (or electromagnetic-wave transmitting cover) which can achieve range extension and angle widening of a sensing radar and is excellent in design property.

There is provided an electromagnetic-wave transmitting cover according to the present invention to solve the above problem. The electromagnetic-wave transmitting cover includes a base material made of a material which can transmit an electromagnetic wave, a light-transmitting base material formed on a surface of the base material and made of a light-transmissive material, and a design layer disposed between the base material and the light-transmitting base material, and transmits an electromagnetic wave. The electromagnetic-wave transmitting cover has an electromagnetic-wave transmitting area which transmits the electromagnetic wave. The base material and the light-transmitting base material in the electromagnetic-wave transmitting area has an interval of 0.12 mm or less, an adhesive layer is formed on an entire surface between the base material and the light-transmitting base material, and a deviation in angle of the electromagnetic wave when the electromagnetic wave is transmitted through the electromagnetic-wave transmitting cover is 0.3° or less.

The electromagnetic-wave transmitting cover according to the present invention has an electromagnetic-wave transmitting area which transmits an electromagnetic wave. The electromagnetic-wave transmitting cover has the electromagnetic-wave transmitting area to reliably transmit an electromagnetic wave.

In the electromagnetic-wave transmitting cover according to the present invention, an adhesive layer is formed between the base material and the light-transmitting base material in the electromagnetic-wave transmitting area. The adhesive layer is formed between the two base materials to bond and fix the two base materials to each other. The design layer is disposed between the two base materials. In the electromagnetic-wave transmitting cover according to the present invention, the two base materials are bonded and fixed to each other in a state in which the design layer is disposed.

In the electromagnetic-wave transmitting cover according to the present invention, since the two base materials are fixed to each other with the adhesive layer, a fixing mechanism need not be disposed at end portions of the base materials. More specifically, the design layer can be formed up to the end portion of the electromagnetic-wave transmitting cover. As a result, the electromagnetic-wave transmitting cover according to the present invention can achieve various design expressions. Since a fixing mechanism need not be disposed at the ends of the base materials, the electromagnetic-wave transmitting area can be expanded. As a result, angle widening of an electromagnetic wave (for example, a sensing radar) transmitted through the electromagnetic-wave transmitting area can be achieved.

Furthermore, in the electromagnetic-wave transmitting cover according to the present invention, the adhesive layer is formed between the two base materials to laminate the base material, the adhesive layer, and the light-transmitting base material in this order. The adhesive layer formed between the two base materials does not generate a phase difference in the electromagnetic wave in comparison with air (i.e., the conventional technique) used when the adhesive layer is not formed. More specifically, a deviation in angle can be suppressed. The deviation in angle mentioned here means a deviation in phase of an electromagnetic wave.

More specifically, in a millimeter-wave radar serving as an example of a radar using the electromagnetic-wave transmitting cover according to the present invention, reflected waves from an object to be detected is received by a plurality of receiving antennas. A horizontal position of the object to be detected is calculated and detected by a phase difference between the reflected waves. For this reason, when a deviation occurs in the phase of a received millimeter wave, a phase difference is deviated, and the position of the object to be detected is detected as a position different from a proper position. The deviation in phase (for example, deviation in phase difference) can be detected as a deviation in angle from a straight line (direction) connecting the radar device and the object to be detected to each other.

In the electromagnetic-wave transmitting cover according to the present invention, the distance between the two base materials is 0.12 mm or less to suppress a deviation in angle from increasing so as to achieve a deviation in angle of 0.3° or less. More specifically, range extension of an electromagnetic wave (for example, a sensing radar) transmitted through the electromagnetic-wave transmitting cover can be achieved.

As described above, the electromagnetic-wave transmitting cover according to the present invention can achieve range extension and angle widening of a sensing radar to obtain an electromagnetic-wave transmitting cover which is excellent in design property.

In the electromagnetic-wave transmitting cover according to the present invention, a difference obtained by subtracting the relative permittivities of the base material and the translucent base material from the relative permittivity of the adhesive layer preferably ranges from −1.72 to 2.58. The difference between the relative permittivities (i.e., the difference between the relative permittivity of the adhesive layer and the relative permittivities of the base material and the translucent base material) falls within the range to make it possible to suppress a deviation in angle (i.e., increase of the deviation in angle).

The electromagnetic-wave transmitting cover according to the present invention is preferably disposed in front of a millimeter-wave radar. The millimeter-wave radar means a device which transmits and receives a millimeter wave. Since the electromagnetic-wave transmitting cover according to the present invention can achieve range extension and angle widening of a sensing radar, an applied millimeter-wave radar (in particular, a millimeter-wave radar for vehicle) can exert the above effect.

The electromagnetic-wave transmitting cover according to the present invention is preferably formed such that, after either one of the base material and the translucent base material is molded, the other one of the base materials is insert-molded together with an adhesive agent. The insert molding is performed with the adhesive agent to obtain the electromagnetic-wave transmitting cover in which an adhesive layer is formed between the base materials.

DETAILED DESCRIPTION

The present invention will be described in detail below with reference to an embodiment.

Embodiment

As an embodiment of the present invention, a cover of a millimeter-wave radar for vehicle is formed. In the embodiment, an example in which a cover of a millimeter-wave radar disposed on a vehicle grille is applied as an electromagnetic-wave transmitting cover is given. However, the present invention is not limited to the embodiment.

Figure 1:
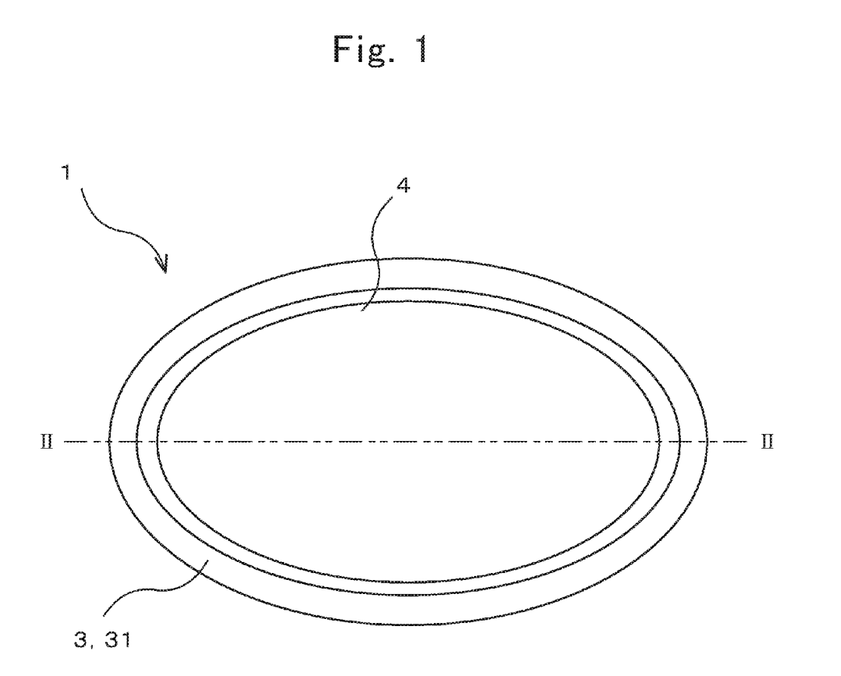
FIG. 1 is a front view of an electromagnetic-wave transmitting cover according to an embodiment.
Figure 2:
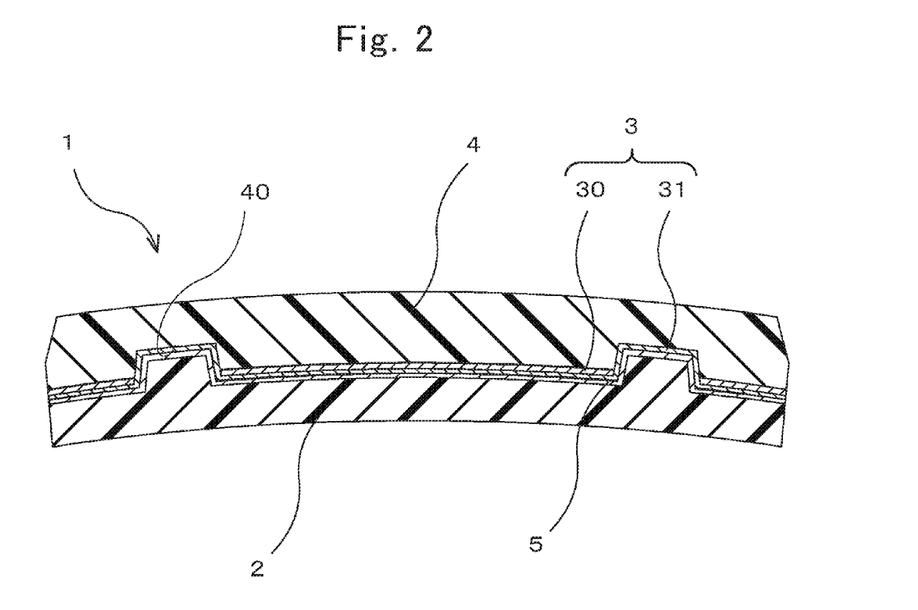
FIG. 2 is a sectional view of the electromagnetic-wave transmitting cover according to the embodiment.
Figure 3:
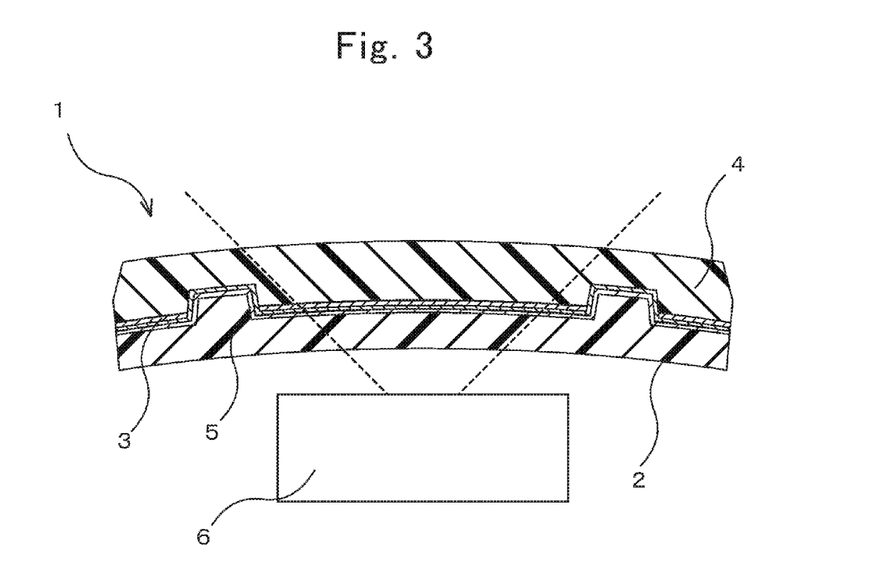
FIG. 3 is a diagram showing a relationship between the electromagnetic-wave transmitting cover according to the embodiment and a millimeter-wave radar.

FIG. 1 shows a front view of a configuration of an electromagnetic-wave transmitting cover 1 according to the embodiment, and FIG. 2 shows a sectional view along a II to II line in FIG. 1. FIG. 3 shows a relationship between the electromagnetic-wave transmitting cover 1 and a millimeter-wave radar device 6 when the electromagnetic-wave transmitting cover 1 is used in a millimeter-wave radar.

Electromagnetic-Wave Transmitting Cover

The electromagnetic-wave transmitting cover 1 according to the embodiment, as shown in FIGS. 1 and 2, has a plate-like shape having a substantially elliptical outer shape. The electromagnetic-wave transmitting cover 1 has a base material 2, a design layer 3, a light-transmitting base material 4, and an adhesive layer 5. The electromagnetic-wave transmitting cover 1 according to the embodiment, as shown in FIG. 3, is disposed in front of (i.e., a transmission direction of a millimeter wave) the millimeter-wave radar device 6.

Base Material

The base material 2 is located on the rear side of the electromagnetic-wave transmitting cover 1, and the design layer 3 and the light-transmitting base material 4 are located in front of the electromagnetic-wave transmitting cover 1. The base material 2 is made of a material through which an electromagnetic wave can be transmitted. Since the base material 2 is made of the material through which an electromagnetic wave can be transmitted, the cover can transmit the electromagnetic wave (i.e., a millimeter wave) to cause the radar to function as a millimeter-wave radar.

The base material 2, as shown in FIGS. 1 and 2, has a plate-like shape having a substantially elliptical outer shape matched with the outer shape of the electromagnetic-wave transmitting cover 1. A surface (front surface) of the base material 2 on the front side has an uneven shape corresponding to the design expression (more specifically, a groove portion 40 (to be described later) of the design layer 3.

Examples of a material of which the base material 2 is made and through which an electromagnetic wave is transmitted include, but are not limited to, resins such as a polycarbonate resin, an acrylic resin, an AES resin, and an ABS resin.

The base material 2 may have a latching means to attach the electromagnetic-wave transmitting cover 1 to the vehicle. The base material 2 preferably has a positioning means which sets relative positions of the electromagnetic-wave transmitting cover 1 and the millimeter-wave radar device 6. The base material 2 has these means to make it possible to locate and fix the electromagnetic-wave transmitting cover 1 to the vehicle and the millimeter-wave radar device 6.

Design Layer

The design layer 3 is disposed between the base material 2 and the light-transmitting base material 4. The design layer 3 performs design expression on the electromagnetic-wave transmitting cover 1.

The design layer 3 may be formed by depositing a metal material such as indium on the base material 2 or the light-transmitting base material 4, or may be printed and formed on the base material 2 or the light-transmitting base material 4 by screen printing or the like. Furthermore, predetermined design printed and formed on a transfer film is transferred and formed on the base material 2 or the light-transmitting base material 4. The design layer 3 obtained by depositing or printing predetermined design on a resin film may be laminated on the base material 2 or the light-transmitting base material 4. As the material of the design layer 3, a material of one type or materials of two or more types may be used. The design layer 3 may be configured by a single layer or a multilayer. For example, a layer obtained by bonding small pieces of film on which a second design is deposited and formed on a resin film on which a first design is printed and formed may be used as the design layer 3. Furthermore, a protecting layer may be formed on the front-surface side and/or the rear-surface side of the design layer 3.

In this embodiment, the design layer 3 is laminated and formed on the front surface (or rear surface) of the light-transmitting base material 4 on the rear side thereof. The design layer 3 has a printed portion 30 obtained by screen-printing a black paint and a deposited portion 31 obtained by depositing indium.

The printed portion 30 is printed on the rear surface of the light-transmitting base material 4. The printed portion 30 is not formed on the interior (more specifically, on an inner peripheral surface) of a groove portion 40 formed on the rear surface of the light-transmitting base material 4.

The deposited portion 31 is deposited on the rear surface of the printed portion 30 and on the interior of the groove portion 40. With the printed portion 30 and the deposited portion 31, when the electromagnetic-wave transmitting cover 1 according to the embodiment is visually checked from the front-surface side, a metal color obtained by the deposited portion 31 can be confirmed in the groove portion 40, a black color obtained by the printed portion 30 is displayed on portions except for the groove portion 40.

On the rear surface of the design layer 3, a reinforcing layer obtained by heat-dry-coating or UV-coating an acrylic resin is laminated (this configuration is not shown). This reinforcing layer is interposed between the design layer 3 and the base material 2 and between the design layer 3 and the adhesive layer 5.

Light-Transmitting Base Material

The light-transmitting base material 4 is formed on the front surface of the base material 2 and made of a light-transmissive material. The light-transmissive material means a material through which at least visible light is transmitted, and is preferably a transparent or semi-transparent resin through which the design layer 3 can be visually checked.

The light-transmitting base material 4, as shown in FIGS. 1 and 2, has a plate-like shape having an elliptical outer shape matched with the outer shape of the electromagnetic-wave transmitting cover 1. The outer peripheral shape of the light-transmitting base material 4 is matched with the outer peripheral shape of the base material 2. In the light-transmitting base material 4, as shown in FIGS. 1 and 2, the groove portion 40 concaved from the rear surface to the front side is formed. The groove portion 40 of the light-transmitting base material 4 has a shape of design expression of the design layer 3. In the embodiment, as shown in FIGS. 1 and 2, the groove portion 40 is formed in an end portion of the electromagnetic-wave transmitting cover 1.

The rear surface of the light-transmitting base material 4 has an uneven shape substantially matched with the front surface of the base material 2. More specifically, the front surface of the base material 2 is formed to have a shape (i.e., both the surfaces can be brought into tight contact with each other while being substantially matched with each other) corresponding to the groove portion 40 of the light-transmitting base material 4.

The light-transmitting base material 4 configures a front-side portion of the electromagnetic-wave transmitting cover 1 according to the embodiment. Although a light-transmissive material constituting the light-transmitting base material 4 is not limited to a specific material, a material having a high weather resistance is preferably selected. As the light-transmissive material (for example, a transparent resin material) having a high weather resistance, a resin such as a polycarbonate resin or an acrylic resin can be given.

The light-transmitting base material 4 is preferably made of a material having a relative permittivity equal to that of the base material 2. More specifically, when the base material 2 is made of an AES resin, the light-transmitting base material 4 is preferably made of polycarbonate (PC). The relative permittivity of PC and the relative permittivity of AES are each 2.7 (2.6 to 2.8) at room temperature and 76.5 GHz.

Adhesive Layer

The adhesive layer 5 is formed between the base material 2 and the light-transmitting base material 4. The adhesive layer 5 is formed between the base material 2 and the light-transmitting base material 4 to bond both the base materials 2 and 4 to each other. The adhesive layer 5 is preferably formed in an entire area between the base material 2 and the light-transmitting base material 4. The adhesive layer 5 is preferably formed between the base material 2 and the light-transmitting base material 4 without forming an air layer.

In the embodiment, the adhesive layer 5 is disposed between the design layer 3 formed integrally with the light-transmitting base material 4 and the base material 2. More specifically, when the design layer 3 is formed on at least either one of the base materials 2 and 4, the adhesive layer 5 is formed between the design layer 3 and the other one of the base materials 2 and 4.

A method of forming the adhesive layer 5 is not limited to a specific method, and, for example, a method in which, after either one of the base material 2 and the light-transmitting base material 4 is molded, the other one of the base materials 2 and 4 is insert-molded together with an adhesive agent, a method of filling and hardening an adhesive agent between the base materials 2 and 4, and the like can be given.

The adhesive agent is insert-molded together with both the base materials 2 and 4 to make it possible to uniformly wettably spread the adhesive agent with the pressure of an injected resin and to prevent air insertion. In the event that a thermosetting adhesive agent which is hardened with heat of the injected resin is used, the step of hardening the adhesive agent need not be separately performed to make it possible to suppress an increase in number of manufacturing steps.

Although the adhesive agent for forming the adhesive layer 5 is not limited to a specific adhesive agent, a material which can suppress a deviation in angle and attenuation of a millimeter wave (electromagnetic wave) when the adhesive layer 5 is formed. As the adhesive agent, an adhesive agent made of a resin such as polyester, epoxy, acrylic, urethane, polyamide, or silicone can be given. Especially, as described above, as an adhesive agent suitable for adhesion in insert molding, a resin adhesive agent such as epoxy, urethane, silicone, or nylon is given. An epoxy-resin adhesive agent which is of a thermosetting type and is not decomposed at a temperature (for example, 230° C.) of the resin is preferably used.

The epoxy-resin adhesive agent also has a low water absorption rate (or a moisture permeability) of 3.8%. For this reason, even though the adhesive layer 5 is exposed at the end portion (i.e., end face) of the electromagnetic-wave transmitting cover 1, moisture can be suppressed from being inserted between both the base materials 2 and 4 to suppress design property from being deteriorated.

As the adhesive agent for forming the adhesive layer 5, due to its workability, a liquid adhesive agent in a state in which the adhesive agent can be applied to at least either one of the base material 2 and the light-transmitting base material 4 is preferably used. A solution-type adhesive agent (solvent-type adhesive agent) is more preferably used. Since the solvent-type adhesive agent is of a coating type, the adhesive agent preferably has a viscosity of 500 mPa or less (i.e., a low-viscosity adhesive agent) is preferably used.

The low-viscosity adhesive agent flows between the front surface of the base material 2 and the rear surface of the light-transmitting base material 4 to fill the space. More specifically, even though the front surface of the base material 2 and the rear surface of the light-transmitting base material 4 have uneven surfaces, both the base materials 2 and 4 can be bonded to each other throughout the entire surfaces.

Even in the adhesive layer 5, a difference between the relative permittivities of both the base materials 2 and 4 is preferably small. When the difference between the relative permittivities becomes large, a deviation in angle of an electromagnetic wave (i.e., millimeter wave) transmitted through the electromagnetic-wave transmitting cover 1 becomes large. More specifically, differences between the relative permittivities of the base material 2 and the light-transmitting base material 4 and the relative permittivity of the adhesive layer 5 are preferably −1.72 to 2.58. When the differences between the relative permittivities fall within the above range, the deviation in angle of the millimeter wave can be suppressed to 0.3° or less.

The relative permittivity of the adhesive layer 5 may be equal to the relative permittivity of the adhesive agent for forming the adhesive layer 5. The relative permittivity of the adhesive agent preferably ranges from 0.98 to 5.28.

When an additive such as an inorganic filler is added to the adhesive layer 5, the relative permittivity or the dielectric tangent of the adhesive layer 5 tends to increase. Since an inorganic-filler-free epoxy resin has a small dielectric tangent and differences between the relative permittivity of the epoxy resin and the relative permittivities of both the base materials 2 and 4 are small, the inorganic-filler-free epoxy resin is preferably used.

Millimeter-Wave Radar Device

The millimeter-wave radar device 6 is a device which transmits/receives a millimeter wave and is used in a conventional millimeter-wave radar. The millimeter-wave radar device 6 calculates a transmission/reception result with an arithmetic operation means to measure an inter-vehicle distance and a relative speed between one's own vehicle and a preceding vehicle.

Manufacturing Method

The electromagnetic-wave transmitting cover 1 according to the embodiment is not limited in a manufacturing method therefor, and can be manufactured by the following method, for example.

Figure 4A:
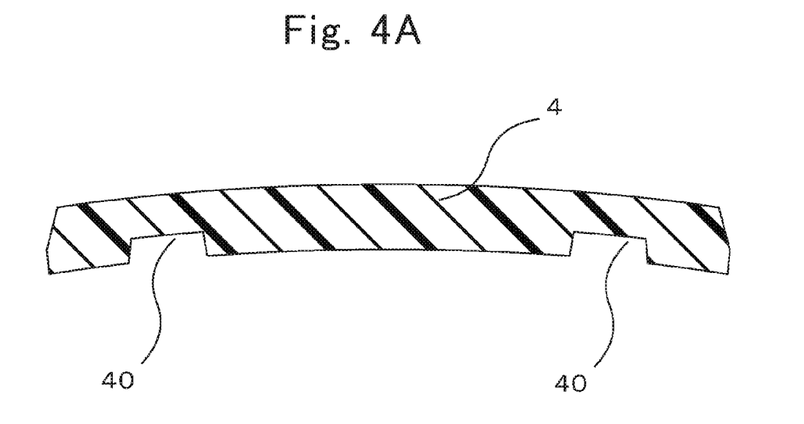
FIG. 4A is a sectional view showing one of the manufacturing steps of the electromagnetic-wave transmitting cover according to the embodiment.

The light-transmitting base material 4 is molded by injection molding (FIG. 4A).

Figure 4B:
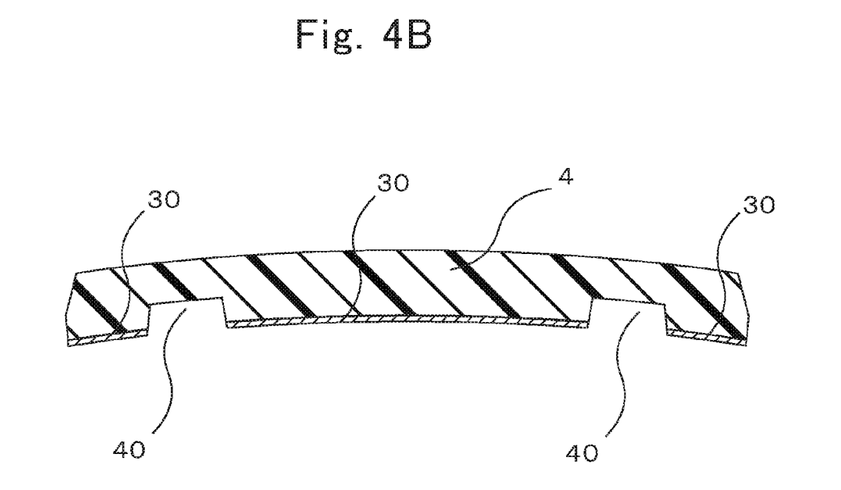
FIG. 4B is a sectional view showing one of the manufacturing steps of the electromagnetic-wave transmitting cover according to the embodiment.

The printed portion 30 is formed on the rear surface of the light-transmitting base material 4. More specifically, a black paint is screen-printed on a part except for the interior of the groove portion 40 on the rear surface of the light-transmitting base material 4 to form the printed portion 30 (FIG. 4B).

The front surface and the side surface of the obtained complex between light-transmitting base material 4 and the printed portion 30 are masked. Indium is deposited on the rear surface of the printed portion 30 and the interior of the groove portion 40 to form the deposited portion 31. After the completion of the step, a protecting layer made of an acrylic resin is formed on the rear surfaces of the printed portion 30 and the deposited portion 31 by thermal-dry coating or UV coating.

Figure 4C:
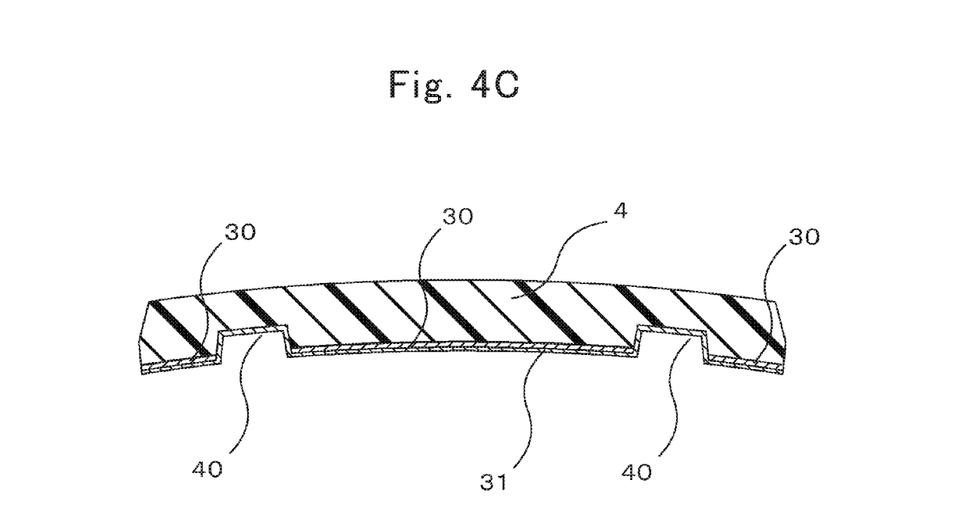
FIG. 4C is a sectional view showing one of the manufacturing steps of the electromagnetic-wave transmitting cover according to the embodiment.

With the above step, a member (i.e., a laminated body) formed by laminating the design layer 3 on the light-transmitting base material 4 is manufactured (FIG. 4C).

The manufactured laminated body is disposed in an injection mold. At this time, on the entire area of the rear surface (i.e., the printed portion 30 and the deposited portion 31 of the design layer 3) of the laminated body, a solvent-type adhesive agent is coated to have a thickness of 0.12 mm or less.

Figure 4D:
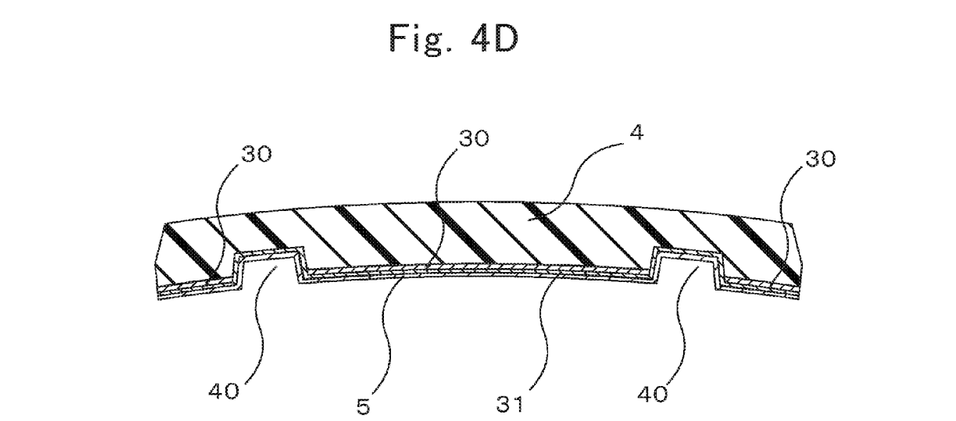
FIG. 4D is a sectional view showing one of the manufacturing steps of the electromagnetic-wave transmitting cover according to the embodiment.

The base material 2 is molded by insert molding (FIG. 4D). More specifically, a molten mixture resin material between a melted AES resin and carbon black is injected into a cavity of the injection mold in which the laminated body is disposed. The molten mixture resin material is injected to mold the base material 2.

When the molten mixture resin material is injected, a heated adhesive agent is melted in the molten mixture resin material to bond the base material 2 and the laminated body to each other through the adhesive agent throughout the entire surfaces. At this time, due to the presence of the protecting layer, the adhesive agent is permeated into the protecting layer with the solvent to also solidly bond the protecting layer to the light-transmitting base material 4.

As described above, the electromagnetic-wave transmitting cover 1 in which the base material 2 and the light-transmitting base material 4 are bonded to each other with the adhesive layer 5 can be obtained (FIG. 2).

Overall Configuration

In the electromagnetic-wave transmitting cover 1 according to the embodiment, an interval between the base material 2 and the light-transmitting base material 4 is 0.12 mm or less. The interval between the base material 2 and the light-transmitting base material 4 is a distance between the front surface of the base material 2 and the rear surface of the light-transmitting base material 4 (i.e., a distance in a direction vertical to both the surfaces). In the embodiment, a maximum distance between the front surface of the base material 2 and the rear surface of the light-transmitting base material 4 is 0.12 mm or less.

In the electromagnetic-wave transmitting cover 1 according to the embodiment, a deviation in angle when an electromagnetic wave is transmitted through the electromagnetic-wave transmitting cover 1 is 0.3° or less.

Figure 5:
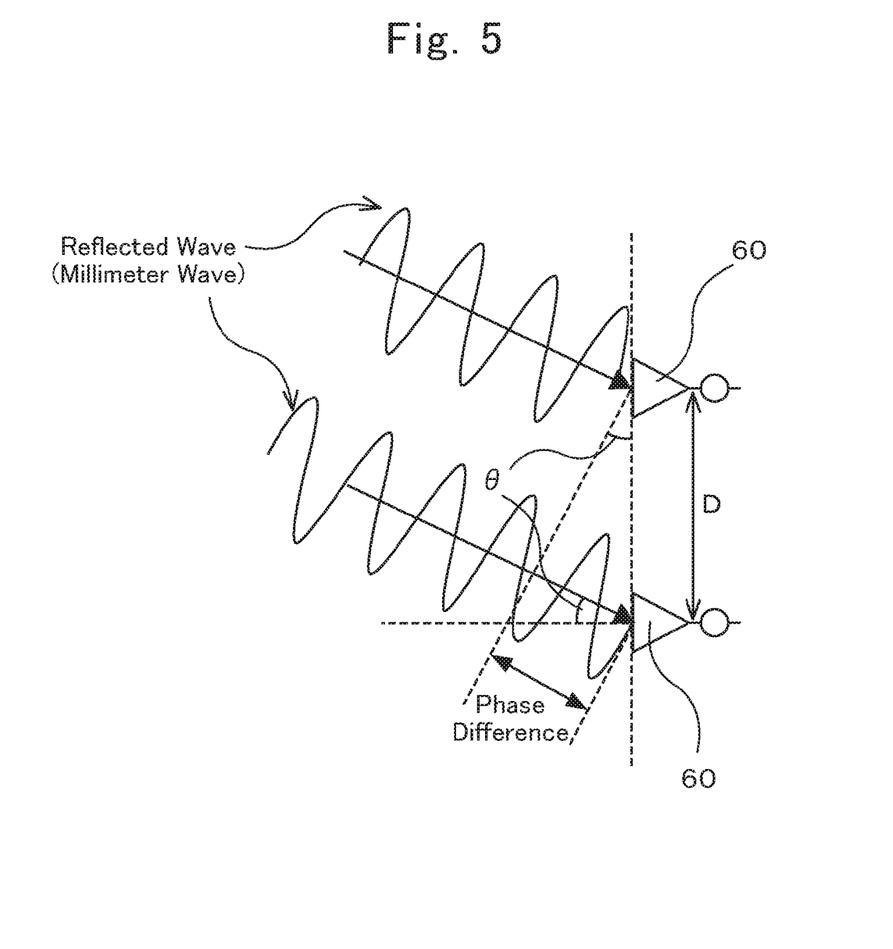
FIG. 5 is a schematic view showing a deviation in angle of a millimeter wave.

As described above, in the millimeter-wave radar, as shown in FIG. 5, reflected waves from an object to be detected are received by a plurality of antennas 60. A horizontal position of the object to be detected is calculated and detected by a phase difference between the reflected waves. As shown in FIG. 5, when a phase difference, a detection angle, a frequency, and an inter-receiving-antenna distance are given by $\Delta\psi$ (rad), $\theta$ (°), f (GHz), and D (mm), respectively, a relationship given by the following expression (1) is satisfied.

Numerical Expression 1

$$\Delta\phi = \frac{2\pi fD}{c}\sin\theta \quad (1)$$

As indicated by FIG. 5 and Numerical Expression 1, when a deviation in angle of reflected waves occurs in a millimeter-wave radar, detection angles of the reflected waves are erroneously determined.

Propagation rates of electromagnetic waves (i.e., millimeter waves) vary depending on materials constituting the cover 1. In the millimeter-wave cover 1, when relative permittivities of paths through which electromagnetic waves (i.e., a millimeter wave) is transmitted are different from each other, a phase difference occurs.

Figure 6:
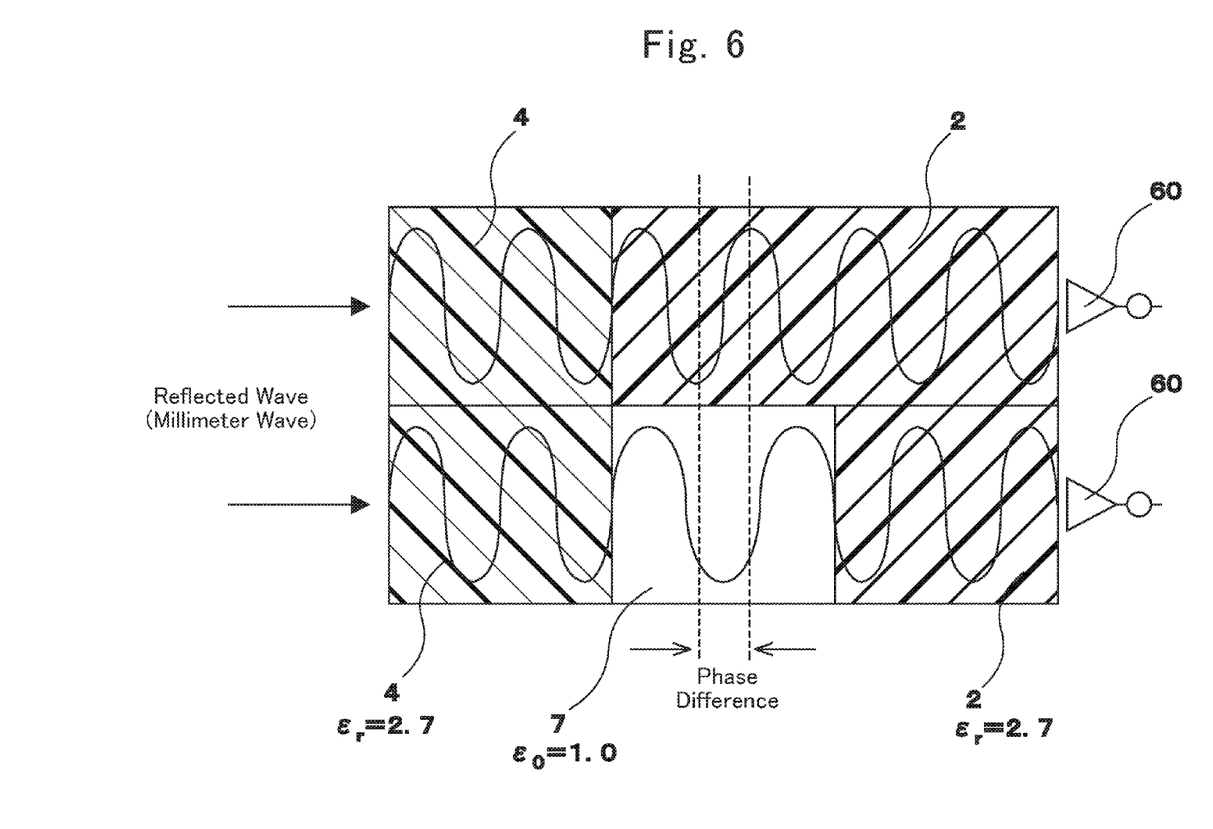
FIG. 6 is a sectional view showing deviations in angle of millimeter waves transmitted through the electromagnetic-wave transmitting cover according to the embodiment and a conventional electromagnetic-wave transmitting cover.

As shown in a schematic view in FIG. 6, when the millimeter wave is transmitted through the electromagnetic-wave transmitting cover 1 (i.e., the base material 2, the adhesive layer 5, and the light-transmitting base material 4), the phase of the millimeter wave is not deviated. In the electromagnetic-wave transmitting cover 1 according to the embodiment, both a PC resin constituting the light-transmitting base material 4 and an AES resin constituting the base material 2 have the same relative permittivity (2.7). For this reason, as shown in an upper part in FIG. 6, a deviation in phase does not occur in reflected waves (electromagnetic waves or millimeter waves). In FIG. 6, the adhesive layer 5 is omitted.

In contrast to this, in a conventional configuration in which an air layer 7 is formed in place of the adhesive layer 5, as shown in a lower part in FIG. 6, the air layer 7 having a relative permittivity (1.0) different from those of the base material 2 and the light-transmitting base material 4 is formed between the base material 2 and the light-transmitting base material 4. When an electromagnetic wave is transmitted through the cover having the above configuration, as shown in the drawing, a phase difference occurs in the electromagnetic wave transmitted through the air layer 7.

As described above, according to the electromagnetic-wave transmitting cover 1 of the embodiment, a deviation in angle is suppressed when an electromagnetic wave is transmitted through the cover 1.

When the cover has the air layer 7 shown in the lower part in FIG. 6, a phase difference occurring when the path has different relative permittivities is expressed by Expression (2). A relationship between a detection angle of the radar and the phase difference is expressed by Expression (3).

In the cases expressed by Expression (2) and Expression (3) shown in FIG. 6, reflected waves from the front side are detected. In Expression (2) and Expression (3), when the relative permittivities of the base material 2 (AES resin) and the light-transmitting base material 4 (PC resin), the relative permittivity of the air layer 7, a thickness of the air layer 7, a detection angle of a millimeter wave, an angular deviation allowable angle, a frequency, and an inter-receiving-antenna distance are given by $\varepsilon_r$ (=2.7), $\varepsilon_0$ (=1.0), d (mm), $\theta'$ (=0°), $\theta$ (=±0.3°), f (=76.5 GHz), D (=0.015 m), respectively, Expression (4) is derived from Expression (2) and Expression (3).

According to Expression (4), in order to set a deviation in angle to 0.3° or less, the thickness of the air layer 7 is required to be 0.12 (mm) or less.

Numerical Expression 2

$$\Delta \phi = \frac{2\pi fD}{c}(\sqrt{\varepsilon_r} - \sqrt{\varepsilon_0}) + \frac{2\pi fD}{c}\sin\theta' \quad (2)$$
$$= \frac{2\pi fD}{c}(\sqrt{\varepsilon_r} - \sqrt{\varepsilon_0})$$

$$\Delta \phi = \frac{2\pi fD}{c}\sin(\theta + \theta') \quad (3)$$
$$= \frac{2\pi fD}{c}\sin\theta$$

$$d = \frac{D}{(\sqrt{\varepsilon_r} - 1)}\sin\theta \quad (4)$$
$$= |0.047 \times \sin\theta|$$
$$= 0.00012$$

When the adhesive layer 5 is formed in place of the air layer 7 shown in the lower part in FIG. 6, a difference between relative permittivities in the path occurs. In this case, as the phase difference, Expression (5) is derived from Expression (2). Expression (6) is derived from Expression (3) and Expression (5). In Expression (6), when the relative permittivity of the adhesive layer 5 and the thickness of the adhesive layer 5 are given by $\varepsilon_s$ and $d_s$ (=0.00012 m), respectively, the relative permittivity of the adhesive layer 5 ranges from 0.98 to 5.28. More specifically, as described above, the relative permittivity of the adhesive layer 5 preferably ranges from 0.98 to 5.28.

Numerical Expression 3

$$\Delta \phi = \frac{2\pi fd}{c}(\sqrt{\varepsilon_s} - \sqrt{\varepsilon_r}) + \frac{2\pi fD}{c}\sin\theta' \quad (5)$$
$$= \frac{2\pi fd}{c}(\sqrt{\varepsilon_s} - \sqrt{\varepsilon_r})$$

$$\varepsilon_s = \left(\sqrt{\varepsilon_r} - \frac{D\sin\theta}{d_s}\right)^2 \quad (6)$$
$$= 0.98, 5.28$$

Effect of the Embodiment

The electromagnetic-wave transmitting cover 1 according to the embodiment has the base material 2, the design layer 3, the light-transmitting base material 4, and the adhesive layer 5. The base material 2 and the light-transmitting base material 4 are fixed to each other by the adhesive layer 5 throughout the entire surfaces.

The entire surfaces of the electromagnetic-wave transmitting cover 1 serves as a millimeter-wave transmitting area (electromagnetic-wave transmitting area) which transmits a millimeter wave (i.e., an electromagnetic wave). The electromagnetic-wave transmitting cover 1 according to the embodiment, in the transmitting area, transmits a millimeter wave transmitted from the millimeter-wave radar device 6 disposed rearwardly and a millimeter wave hit and reflected by an object.

In the electromagnetic-wave transmitting cover 1 according to the embodiment, the adhesive layer 5 is formed between the base material 2 and the light-transmitting base material 4. In this configuration, the two base materials 2 and 4 are bonded and fixed to each other by the adhesive layer 5 in a state where the design layer 3 is sandwiched therebetween. In the electromagnetic-wave transmitting cover 1 according to the embodiment, since the two base materials 2 and 4 are fixed to each other by the adhesive layer 5, a fixing mechanism need not be disposed at the end portions of the base materials 2 and 4. For this reason, the design layer 3 (groove portion 40) can be formed up to the end portion of the electromagnetic-wave transmitting cover 1. As a result, the electromagnetic-wave transmitting cover 1 according to the embodiment can achieve various design expressions. Since a fixing mechanism need not be disposed at the ends of the base materials 2 and 4, the electromagnetic-wave transmitting area can be expanded. As a result, angle widening of an electromagnetic wave (i.e., a sensing radar) to be transmitted can be achieved.

Furthermore, in the electromagnetic-wave transmitting cover 1 according to the embodiment, the adhesive layer 5 is formed between the two base materials 2 and 4 to laminate the base material 2, the adhesive layer 5, and the light-transmitting base material 4 in this order. The adhesive layer 5 formed between the two base materials 2 and 4 can minimize a phase difference of a millimeter wave in comparison with air formed when adhesive layer 5 is not formed. More specifically, a deviation in angle can be suppressed.

More specifically, in the electromagnetic-wave transmitting cover 1 according to the embodiment, as shown in FIG. 6, when a millimeter wave is transmitted through the electromagnetic-wave transmitting cover 1 (i.e., the base material 2, the adhesive layer 5, and the light-transmitting base material 4), a phase difference of the millimeter wave can be minimized. In FIG. 6, the design layer 3 is omitted. In contrast to this, in a conventional configuration in which the air layer 7 is formed in place of the adhesive layer 5, as shown in FIG. 6, deviations in phase occur in an interface between the base material 2 and the air layer 7 and an interface between the air layer 7 and the light-transmitting base material 4. As a result, a large deviation in angle occurs.

In the electromagnetic-wave transmitting cover 1 according to the embodiment, the distance (thickness of the adhesive layer 5) between the two base materials 2 and 4 is 0.2 mm or less to suppress a deviation in angle from increasing. As a result, elongation of the range of an electromagnetic wave (i.e., a sensing radar) transmitted through the electromagnetic-wave transmitting cover 1 can be achieved.

As described above, the electromagnetic-wave transmitting cover 1 according to the embodiment is the electromagnetic-wave transmitting cover 1 which can achieve range extension and angle widening of a sensing millimeter wave (radar) and which is excellent in design property.

Modification

Figure 7:
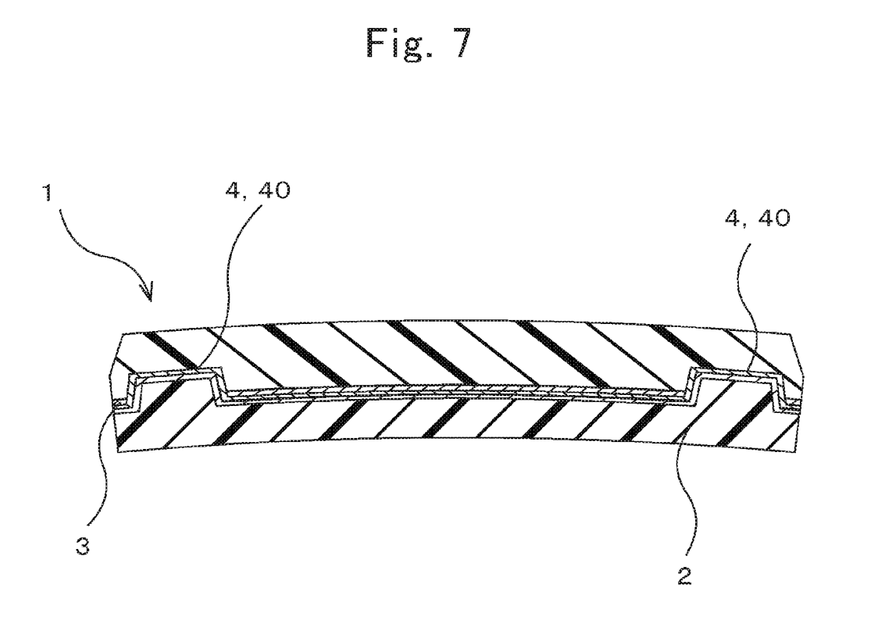
FIG. 7 is a sectional view showing a main part of manufacturing steps of an electromagnetic-wave transmitting cover according to a modification.

The electromagnetic-wave transmitting cover 1 according to the modification, as shown in the sectional shape in FIG. 7, is the same as that of the embodiment except that the design layer 3 is formed on the outer peripheral portion.

As described above, in the electromagnetic-wave transmitting cover 1 according to the embodiment, a position where the design layer 3 is formed is not limited to a specific position, even though the design layer 3 (or the groove portion 40) is formed on the outer peripheral portion as in the modification, the same effect as the effect described above can be exerted. More specifically, since the end portion of the electromagnetic-wave transmitting cover 1 does not have an undercut shape, the design layer 3 (or the groove portion 40) can be formed up to a position close to the end, design expression can be given up to the end portion of the electromagnetic-wave transmitting cover 1 to improve design property.

What is claimed is:

1. An electromagnetic-wave transmitting cover comprising:
   a base material made of a material which can transmit an electromagnetic wave;
   a light-transmitting base material formed on a surface of the base material and made of a light-transmissive material; and
   a design layer disposed between the base material and the light-transmitting base material, the electromagnetic-wave transmitting cover transmitting an electromagnetic wave, wherein
   the electromagnetic-wave transmitting cover has an electromagnetic-wave transmitting area which transmits the electromagnetic wave,
   the base material and the light-transmitting base material in the electromagnetic-wave transmitting area has an interval of 0.12 mm or less, a thermosetting adhesive layer is formed on an entire surface between the base material and the light-transmitting base material, and a deviation in angle of the electromagnetic wave when the electromagnetic wave is transmitted through the electromagnetic-wave transmitting cover is 0.3° or less,
   wherein, after either one of the base material and the light-transmitting base material is molded, the other one of the base materials is insert-molded together with a thermosetting adhesive agent that forms the thermosetting adhesive layer.

2. The electromagnetic-wave transmitting cover according to claim 1, wherein a difference obtained by subtracting the relative permittivity of each of the base material and the light-transmitting base material from the relative permittivity of the adhesive layer ranges from −1.72 to 2.58.

3. The electromagnetic-wave transmitting cover according to claim 1, wherein the electromagnetic-wave transmitting cover is disposed in front of a millimeter-wave radar.

4. An electromagnetic-wave transmitting cover comprising:
   a base material configured to transmit an electromagnetic wave;
   a light-transmitting base material having a plate-shaped to an elliptical outer shape and a shape matching a shape of the base material;
   a design layer disposed between the base material and the light-transmitting base material; and
   a thermosetting adhesive layer covering an entire surface of either the base material or the light-transmitting base material,
   wherein
   the electromagnetic-wave transmitting cover is configured to transmit an electromagnetic wave from a source behind the base material through each of the base material, the thermosetting adhesive layer, the design layer and the light-transmitting base layer,
   the electromagnetic-wave transmitting cover includes an electromagnetic-wave transmitting area comprising adjoining parts of the base material, the design layer, the thermosetting adhesive layer and the light-transmitting base material through which the electromagnetic wave is transmitted,
   the base material and the light-transmitting base material in the electromagnetic-wave transmitting area has an interval of 0.12 mm or less, and
   a deviation in angle of the electromagnetic wave when the electromagnetic wave is transmitted through the electromagnetic-wave transmitting cover is 0.3° or less.

5. The electromagnetic-wave transmitting cover according to claim 4, wherein a difference obtained by subtracting the relative permittivity of each of the base material and the light-transmitting base material from the relative permittivity of the thermosetting adhesive layer ranges from −1.72 to 2.58.

6. The electromagnetic-wave transmitting cover according to claim 4, wherein the electromagnetic-wave transmitting cover is disposed in front of a millimeter-wave radar.

7. The electromagnetic-wave transmitting cover according to claim 4, wherein, after either one of the base material and the light-transmitting base material is molded, the other one of the base materials is insert-molded together with an adhesive agent forming the thermosetting adhesive layer.

* * * * *